(12) United States Patent
Sadrizadeh et al.

(10) Patent No.: US 11,887,279 B2
(45) Date of Patent: Jan. 30, 2024

(54) MACHINE LEARNING-BASED DENOISING OF AN IMAGE

(71) Applicants: Seyedeh Sahar Sadrizadeh, Tehran (IR); Hatef Otroshi Shahreza, Shahreza (IR); Farokh Marvasti, Tehran (IR)

(72) Inventors: Seyedeh Sahar Sadrizadeh, Tehran (IR); Hatef Otroshi Shahreza, Shahreza (IR); Farokh Marvasti, Tehran (IR)

(73) Assignee: SHARIF UNIVERSITY OF TECHNOLOGY, Tehran (IR)

( * ) Notice: Subject to any disclaimer, the term of this patent is extended or adjusted under 35 U.S.C. 154(b) by 256 days.

(21) Appl. No.: 17/206,176

(22) Filed: Mar. 19, 2021

(65) Prior Publication Data

US 2021/0209735 A1 Jul. 8, 2021

Related U.S. Application Data

(60) Provisional application No. 63/069,737, filed on Aug. 25, 2020.

(51) Int. Cl.
*G06T 5/00* (2006.01)
*G06N 3/047* (2023.01)
*G06N 3/048* (2023.01)

(52) U.S. Cl.
CPC ............. *G06T 5/002* (2013.01); *G06N 3/047* (2023.01); *G06N 3/048* (2023.01); *G06T 2207/20081* (2013.01); *G06T 2207/20084* (2013.01)

(58) Field of Classification Search
CPC . G06T 5/00; G06T 5/002; G06T 2207/20081; G06T 2207/20084;
(Continued)

(56) References Cited

U.S. PATENT DOCUMENTS

| | | | |
|---|---|---|---|
| 2015/0363970 A1* | 12/2015 | Spinella-Mamo | G06T 7/596 345/420 |
| 2016/0174902 A1* | 6/2016 | Georgescu | G06V 10/454 600/408 |

(Continued)

*Primary Examiner* — Bobbak Safaipour
*Assistant Examiner* — Benedict E Lee
(74) *Attorney, Agent, or Firm* — Bajwa IP Law Firm; Haris Zaheer Bajwa

(57) ABSTRACT

A method for denoising an image. The method includes training a fully convolutional neural network (FCN) and generating a reconstructed image by applying the FCN on the image. Training the FCN includes generating an $n^{th}$ training image of a plurality of training images, initializing the FCN with a plurality of initial weights, and repeating a first iterative process. The $n^{th}$ training image includes a training array $I_n$. The first iterative process includes extracting an $n^{th}$ denoised training image from the FCN, generating a plurality of updated weights, and replacing the plurality of initial weights with the plurality of updated weights. The $n^{th}$ denoised training image may be extracted by applying the FCN on the $n^{th}$ training image. In an exemplary embodiment, the $n^{th}$ denoised training image may include a denoised array $\hat{I}_n$. The plurality of updated weights is generated by minimizing a loss function including $\Sigma_{n=1}^{N}|I_n - \hat{I}_n|$.

20 Claims, 14 Drawing Sheets

(58) Field of Classification Search
CPC ........ G06N 3/047; G06N 3/048; G06N 3/045;
G06N 7/01; G06N 3/084
See application file for complete search history.

(56) References Cited

U.S. PATENT DOCUMENTS

| | | | |
|---|---|---|---|
| 2019/0172230 A1* | 6/2019 | Mailhe | .................... G06T 5/002 |
| 2021/0157911 A1* | 5/2021 | Yu | .......................... G06N 20/00 |
| 2021/0398252 A1* | 12/2021 | Song | ......................... G06T 5/50 |
| 2022/0335574 A1* | 10/2022 | Tang | .................... G06V 10/774 |

* cited by examiner

106

126

MACHINE LEARNING-BASED DENOISING OF AN IMAGE

CROSS-REFERENCE TO RELATED APPLICATION

This application claims the benefit of priority from U.S. Provisional Patent Application Ser. No. 63/069,737, filed on Aug. 25, 2020, and entitled "IMAGE DENOISING," which is incorporated herein by reference in its entirety.

TECHNICAL FIELD

The present disclosure generally relates to image denoising, and particularly, to image denoising based on convolutional neural networks.

BACKGROUND

Images are often contaminated by noise, negatively impacting visual quality and automated processing of images. Therefore, image denoising is a necessary preprocessing step for image processing applications. Among various types of noise, impulsive noise is very likely to corrupt images in digital image transmission and acquisition. Impulsive noise refers to a type of noise that randomly changes pixel values of images to values that are independent of original pixel values. Impulsive noises may occur due to transmission errors over noisy communication channels and sensor failures of imaging devices. In images corrupted by impulsive noise, values of random pixels in images may change regardless of original values of corresponding pixels, and consequently, information of noisy pixels may be lost. A random-valued impulsive noise (RVIN) may change a value of a pixel to a random value that is uniformly distributed in image intensity range. To remove RVIN, one may first determine noisy pixels and then estimate values of noisy pixels to original values. However, performance of this approach may highly depend on precise estimation of noisy pixels, which is hard to determine. Another approach may introduce a loss function as a measure of image reconstruction quality and utilize optimization methods to minimize the loss function. However, optimization approaches may be of high computational complexity. There is, therefore, a need for an image denoising method that is insensitive to estimation of noisy pixels and provides denoised images with low computational complexity.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for denoising an image. An exemplary method may include training a fully convolutional neural network (FCN) and generating a reconstructed image by applying the FCN on the image. In an exemplary embodiment, the FCN may be trained utilizing one or more processors. In an exemplary embodiment, training the FCN may include generating an $n^{th}$ training image of a plurality of training images, initializing the FCN with a plurality of initial weights, and repeating a first iterative process until a first termination condition is satisfied. In an exemplary embodiment, the $n^{th}$ training image may include a plurality of training channels and a training array $I_n$ of size $N_h \times N_w \times C$ where $N_h$ is a height of the $n^{th}$ training image, $N_w$ is a width of the $n^{th}$ training image, C is a number of the plurality of training channels, $1 \leq n \leq N$, and N is a number of the plurality of training images. In an exemplary embodiment, the first iterative process may include extracting an $n^{th}$ denoised training image from an output of the FCN, generating a plurality of updated weights, and replacing the plurality of initial weights with the plurality of updated weights. In an exemplary embodiment, the $n^{th}$ denoised training image may be extracted by applying the FCN on the $n^{th}$ training image. In an exemplary embodiment, the $n^{th}$ denoised training image may include a denoised array $\hat{I}_n$ of size $N_h \times N_w \times C$. In an exemplary embodiment, the plurality of updated weights may be generated by minimizing a loss function including $\Sigma_{n=1}^{N}|I_n - \hat{I}_n|$ where $|.|$ is an L1 norm. In an exemplary embodiment, each updated weight of the plurality of updated weights may be associated with a respective initial weight of the plurality of initial weights. In an exemplary embodiment, the reconstructed image may be generated utilizing the one or more processors.

In an exemplary embodiment, generating the $n^{th}$ training image may include extracting a random variable p from a noise probability distribution and obtaining the training array $I_n$ based on the random variable p. In an exemplary embodiment, a lower bound of a support set of the noise probability distribution may be equal to $p_l$ and an upper bound of the support set may be equal to $p_u$ where $0 \leq p_l \leq p_u \leq 1$, $$\frac{p_l + p_u}{2} \leq \mu,$$

and $\mu$ is a mean of the noise probability distribution. In an exemplary embodiment, the training array $I_n$ may be obtained by extracting a binary random variable from a Bernoulli probability distribution, setting an $(i, j, c)^{th}$ entry of the training array $I_n$ to an $(i, j, c)^{th}$ entry of an $n^{th}$ original image, extracting a noise value from a uniform probability distribution, and setting the $(i, j, c)^{th}$ entry of the training array $I_n$ to the noise value. In an exemplary embodiment, a parameter of the Bernoulli probability distribution may be equal to p. In an exemplary embodiment, the $(i, j, c)^{th}$ entry of the training array $I_n$ may be set to the $(i, j, c)^{th}$ entry of the $n^{th}$ original image responsive to the binary random variable being equal to 0 where $1 \leq i \leq N_h$, $1 \leq j \leq N_w$, and $1 \leq c \leq C$. In an exemplary embodiment, a support set of the uniform probability distribution may be equal to an intensity range of the $n^{th}$ original image. In an exemplary embodiment, the $(i, j, c)^{th}$ entry of the training array $I_n$ may be set to the noise value responsive to the binary random variable being equal to 1. In an exemplary embodiment, extracting the random variable p from the noise probability distribution may include extracting the random variable p from a truncated Gaussian probability distribution.

In an exemplary embodiment, applying the FCN on the $n^{th}$ training image may include extracting an $(L+1)^{th}$ plurality of training feature maps from an output of an $L^{th}$ convolutional layer of a plurality of convolutional layers and applying a sigmoid function on each of the $(L+1)^{th}$ plurality of training feature maps where L is a number of the plurality of convolutional layers. In an exemplary embodiment, the plurality of convolutional layers may be associated with the FCN. In an exemplary embodiment, extracting the $(L+1)^{th}$ plurality of training feature maps may include obtaining an $(l+1)^{th}$ plurality of training feature maps by generating an $(l+1)^{th}$ plurality of filtered training feature maps, generating an $(l+1)^{th}$ plurality of normalized training feature maps, and generating the $(l+1)^{th}$ plurality of training feature maps where $1 \leq l \leq L$. In an exemplary embodiment, the $(l+1)^{th}$ plurality of filtered training feature maps may be generated by applying an $l^{th}$ plurality of filters on an $l^{th}$ plurality of training feature maps. In an exemplary embodiment, a first plurality of training feature maps may include the plurality of training channels. In an exemplary embodiment, a number of the $l^{th}$ plurality of filters may be equal to $M_r$, where $$r = \left\lceil \frac{l}{R} \right\rceil,$$

$\lceil . \rceil$ is a ceiling operator, R is a positive integer, $$M_t < M_{t+1}, t \leq \left\lceil \frac{l}{2R} \right\rceil - 1, M_{s+1} < M_s, \text{ and } s \geq \left\lceil \frac{l}{2R} \right\rceil.$$

In an exemplary embodiment, the $(l+1)^{th}$ plurality of normalized training feature maps may be generated by applying a batch normalization process on the $(l+1)^{th}$ plurality of filtered training feature maps. In an exemplary embodiment, each normalized training feature map of the $(l+1)^{th}$ plurality of normalized training feature maps may be associated with a respective filtered training feature map of the $(l+1)^{th}$ plurality of filtered training feature maps. In an exemplary embodiment, the $(l+1)^{th}$ plurality of training feature maps may be generated by implementing an $l^{th}$ non-linear activation function on each of the $(l+1)^{th}$ plurality of normalized training feature maps.

In an exemplary embodiment, applying the FCN on the image may include feeding the image to a first convolutional layer of the plurality of convolutional layers, extracting an $(L+1)^{th}$ plurality of feature maps from the output of the $L^{th}$ convolutional layer, and applying the sigmoid function on each of the $(L+1)^{th}$ plurality of feature maps. In an exemplary embodiment, $(L+1)^{th}$ plurality of feature maps may be extracted by obtaining an $(l+1)^{th}$ plurality of feature maps. In an exemplary embodiment, obtaining the $(l+1)^{th}$ plurality of feature maps may include generating an $(l+1)^{th}$ plurality of filtered feature maps, generating an $(l+1)^{th}$ plurality of normalized feature maps, and generating the $(l+1)^{th}$ plurality of feature maps. In an exemplary embodiment, the $(l+1)^{th}$ plurality of filtered feature maps may be generated by applying the $l^{th}$ plurality of filters on an $l^{th}$ plurality of feature maps. In an exemplary embodiment, a first plurality of feature maps may include a plurality of channels associated with the image. In an exemplary embodiment, the $(l+1)^{th}$ plurality of normalized feature maps may be generated by applying the batch normalization process on the $(l+1)^{th}$ plurality of filtered feature maps. In an exemplary embodiment, each of the $(l+1)^{th}$ plurality of normalized feature maps may be associated with a respective filtered feature map of the $(l+1)^{th}$ plurality of filtered feature maps. In an exemplary embodiment, the $(l+1)^{th}$ plurality of feature maps may be generated by implementing the $l^{th}$ non-linear activation function on each of the $(l+1)^{th}$ plurality of normalized feature maps.

In an exemplary embodiment, the method may further include generating a denoised image. In an exemplary embodiment, the denoised image may be generated utilizing the one or more processors. In an exemplary embodiment, generating the denoised image may include repeating a second iterative process until a second termination condition is satisfied. In an exemplary embodiment, the denoised image may include a denoised array $\tilde{I}_q$ where $\tilde{q}$ is a total number of iterations of the second iterative process when the second termination condition is satisfied. In an exemplary embodiment, repeating the second iterative process may include generating a binary mask M from a $q^{th}$ recovered image and generating a $(q+1)^{th}$ recovered image. In an exemplary embodiment, the $q^{th}$ recovered image may include a recovered array $\tilde{I}_q$ of size $N_h \times N_w \times C$ where q is an iteration number. In an exemplary embodiment, a first recovered image may include the reconstructed image. In an exemplary embodiment, generating the $(q+1)^{th}$ recovered image may include generating a non-filtered sampled image, generating a filtered sampled image by applying a low pass filter on the non-filtered sampled image, generating a scaled sampled image by multiplying the filtered sampled image by a scalar, and obtaining the $(q+1)^{th}$ recovered image by adding the $q^{th}$ recovered image to the scaled sampled image. In an exemplary embodiment, generating the binary mask M may include setting an $(i, j, c)^{th}$ entry of the binary mask M to 1 responsive to a first condition being satisfied and setting the $(i, j, c)^{th}$ entry of the binary mask M to 0 responsive to a second condition being satisfied. In an exemplary embodiment, the first condition may be defined according to $|I-\tilde{I}_q|_{i,j,c} \leq \epsilon$ where $|I-\tilde{I}_q|_{i,j,c}$ is an $(i, j, c)^{th}$ entry of $|I-\tilde{I}_q|$, and $\epsilon$ is a noise threshold. In an exemplary embodiment, the second condition may be defined according to $|I-\tilde{I}_q|_{i,j,c} > \epsilon$.

In an exemplary embodiment, repeating the second iterative process may include repeating the second iterative process until one of an iteration condition and a distance condition is satisfied. In an exemplary embodiment, the iteration condition may include $q \geq Q$, where Q is a maximum number of iterations. In an exemplary embodiment, the distance condition may include $\|\tilde{I}_q - \tilde{I}_{q+1}\|_F \leq \delta$, where $\|.\|_F$ is a Frobenius norm and $\delta$ is a termination threshold. In an exemplary embodiment, applying the low pass filter may include applying an exponential filter on the non-filtered sampled image.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method and system for denoising an image. An exemplary method may utilize deep learning wherein a fully convolutional neural network (FCN) is trained by a set of noisy images. An exemplary set of noisy images may be generated by corrupting a number of original images with various densities of impulsive noise so that images with higher densities of impulsive noise are more frequent in the set of noisy images. In training an exemplary FCN, a multi-term loss function including mean squared error (MSE), mean absolute error (MAE), dissimilarity structural index metric (DSSIM) may be minimized. Since impulsive noise may influence only a subset of pixels in an image, impulsive noise may be considered as a sparse signal. Therefore, an exemplary loss function may further include mean absolute error of estimated noise that may ensure sparsity of estimated noise.

After training an exemplary FCN, a noisy image that may be corrupted in a capturing process or in data transmission may be fed to the FCN and a denoised version of the noisy image may be provided at an output of the FCN. Next, an exemplary iterative method may be employed to further enhance a reconstruction quality of an exemplary noisy image. Each iteration in an exemplary iterative method may include detecting positions of noisy pixels and reconstructing pixels of original image in detected positions utilizing an exponential filter.

Figure 1A:
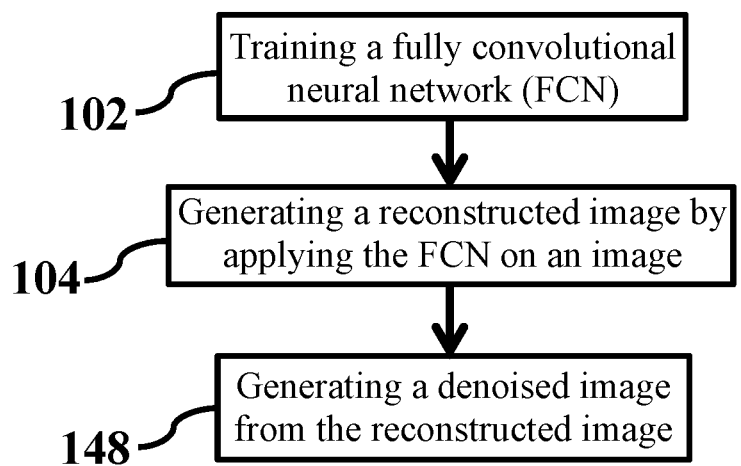
FIG. 1A shows a flowchart of a method for denoising an image, consistent with one or more exemplary embodiments of the present disclosure.

FIG. 1A shows a flowchart of a method for denoising an image, consistent with one or more exemplary embodiments of the present disclosure. An exemplary method 100 may include training a fully convolutional neural network (FCN) (step 102) and generating a reconstructed image by applying the FCN on the image (step 104). In an exemplary embodiment, method 100 may train the FCN and then may utilize the FCN to denoise the image. An exemplary output of the FCN may be less corrupted by noise compared with the image. In an exemplary embodiment, the FCN may be trained utilizing one or more processors.

Figure 2A:
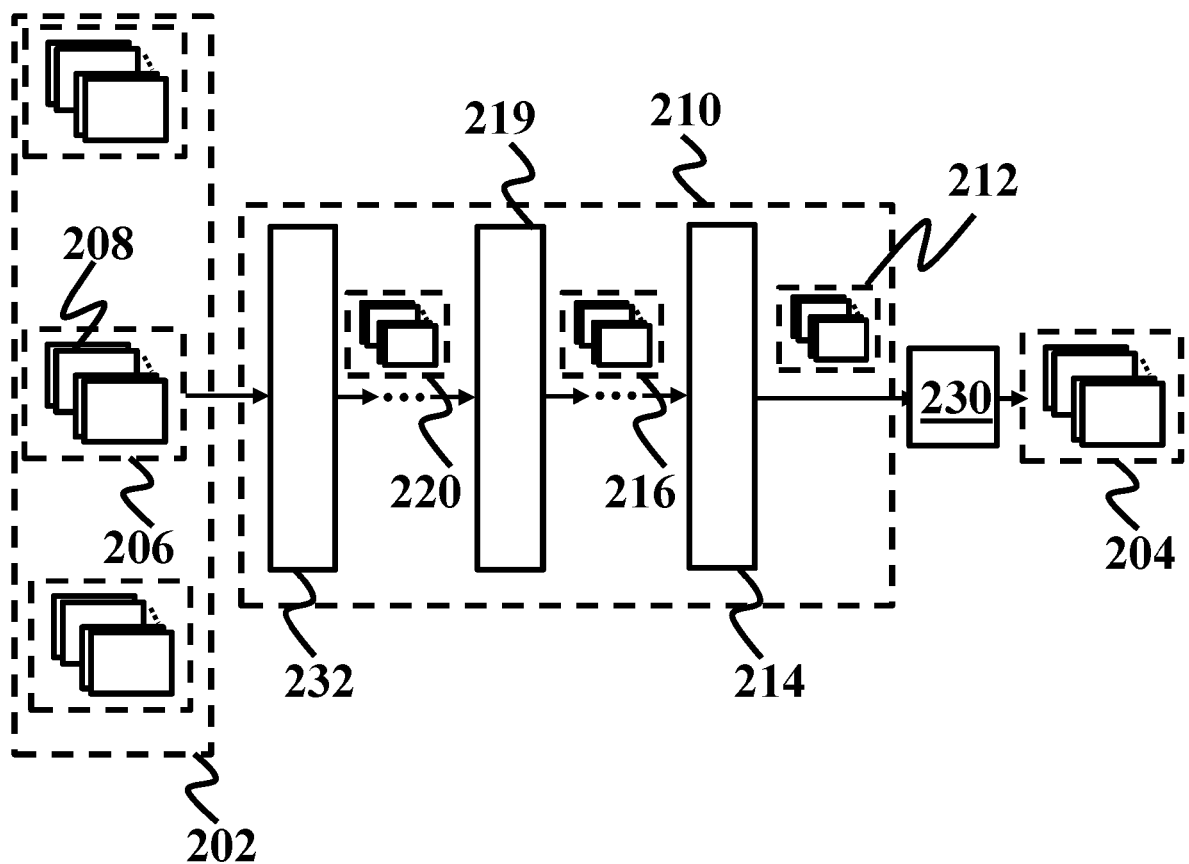
FIG. 2A shows a schematic of a fully convolutional neural network, consistent with one or more exemplary embodiments of the present disclosure.

FIG. 2A shows a schematic of a fully convolutional neural network, consistent with one or more exemplary embodiments of the present disclosure. In an exemplary embodiment, different steps of method 100 may be implemented utilizing an exemplary FCN 200. In an exemplary embodiment, FCN 200 may be trained utilizing a plurality of training images 202. In an exemplary embodiment, plurality of training images 202 may be generated by corrupting a plurality of original images with artificial impulsive noise. In an exemplary embodiment, the plurality of original images may be obtained from an imaging device or a memory. In an exemplary embodiment, FCN may be utilized to generate an $n^{th}$ denoised training image 204 from an $n^{th}$ training image 206 of plurality of training images 202.

Figure 1B:
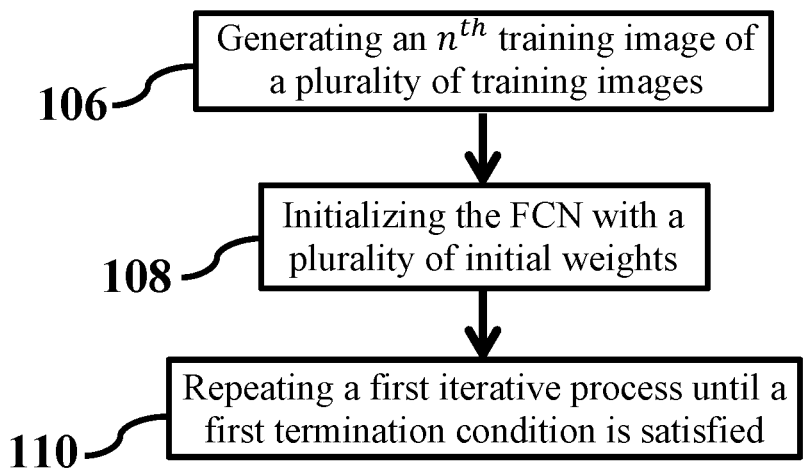
FIG. 1B shows a flowchart for training a fully convolutional neural network (FCN), consistent with one or more exemplary embodiments of the present disclosure.

For further detail with respect to step 102, FIG. 1B shows a flowchart for training a fully convolutional neural network, consistent with one or more exemplary embodiments of the present disclosure. In an exemplary embodiment, training FCN 200 may include generating $n^{th}$ training image 206 (step 106), initializing FCN 200 with a plurality of initial weights (step 108), and repeating a first iterative process until a first termination condition is satisfied (step 110) where $1 \le n \le N$, and N is a number of plurality of training images 202. In an exemplary embodiment, $n^{th}$ training image 206 may include a plurality of training channels 208. In an exemplary embodiment, each of plurality of training channels 208 may include a respective color in a green, a blue, and a red channel of $n^{th}$ training image 206. In an exemplary embodiment, $n^{th}$ training image 206 may include a training array $I_n$ of size $N_h \times N_w \times C$ where $N_h$ is a height of $n^{th}$ training image 206, $N_w$ is a width of $n^{th}$ training image 206, and C is a number of plurality of training channels 208. In an exemplary embodiment, each of plurality of training channels 208 may include an $N_h \times N_w$ matrix in training array $I_n$. An exemplary entry in an $N_h \times N_w$ matrix may include color data of a corresponding pixel of $n^{th}$ training image 206.

Figure 1C:
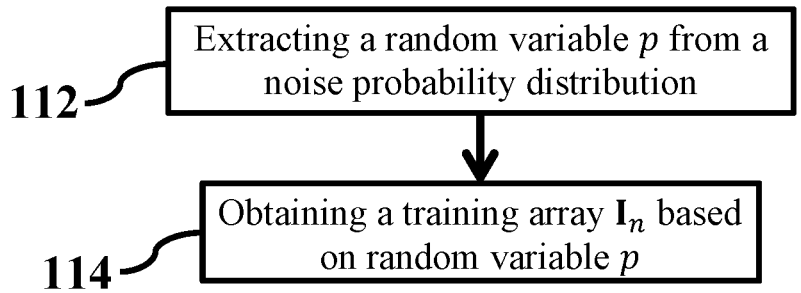
FIG. 1C shows a flowchart for generating a training image, consistent with one or more exemplary embodiments of the present disclosure.

In further detail regarding step 106, FIG. 1C shows a flowchart for generating an $n^{th}$ training image, consistent with one or more exemplary embodiments of the present disclosure. Referring to FIGS. 1A, 1C, and 2A, in an exemplary embodiment, step 106 may include generating $n^{th}$ training image 206. In an exemplary embodiment, generating $n^{th}$ training image 206 may include extracting a random variable p from a noise probability distribution (step 112) and obtaining training array $I_n$ based on random variable p (step 114).

For further detail with respect to step 112, in an exemplary embodiment, a lower bound of a support set of the noise probability distribution may be equal to p, and an upper bound of the support set may be equal to $p_u$ where $0 \le p_l \le p_u \le 1$, $$\frac{p_l + p_u}{2} \le \mu,$$

and μ is a mean of the noise probability distribution. In an exemplary embodiment, when μ is close to upper bound $p_u$, a ratio of number of images that are corrupted by higher levels of impulsive noise to a number of plurality of training images 202 may increase. In an exemplary embodiment, a reconstruction quality of FCN 200 may depend on a level of impulsive noise in each of plurality of training images 202. In an exemplary embodiment, a reconstruction quality of FCN 200 may be higher for training images with lower levels of impulsive noise. As a result, in an exemplary embodiment, a number of training images that are corrupted by higher levels of impulsive noise may be set larger than a number of training images that are corrupted with lower levels of impulsive noise. In an exemplary embodiment, the noise probability distribution may be utilized to achieve a distribution of number of images with a specific level of impulsive noise. In an exemplary embodiment, a number of training images that are corrupted with higher levels of impulsive noise may increase by increasing a value of mean y and since the number of training images is fixed, the number of training images with higher levels of impulsive noise may become larger than a number of training images with lower levels of impulsive noise. In an exemplary embodiment, extracting random variable p from the noise probability distribution may include extracting random variable p from a truncated Gaussian probability distribution. In an exemplary embodiment, random variable p may be generated from a truncated Gaussian probability distribution defined within $(p_l, p_u)$. As a result, in an exemplary embodiment, a minimum level of impulsive noise in plurality of training images 202 may be equal to $p_l$. In contrast, in an exemplary embodiment, a maximum level of impulsive noise in plurality of training images 202 may be equal to $p_u$.

Figure 1D:
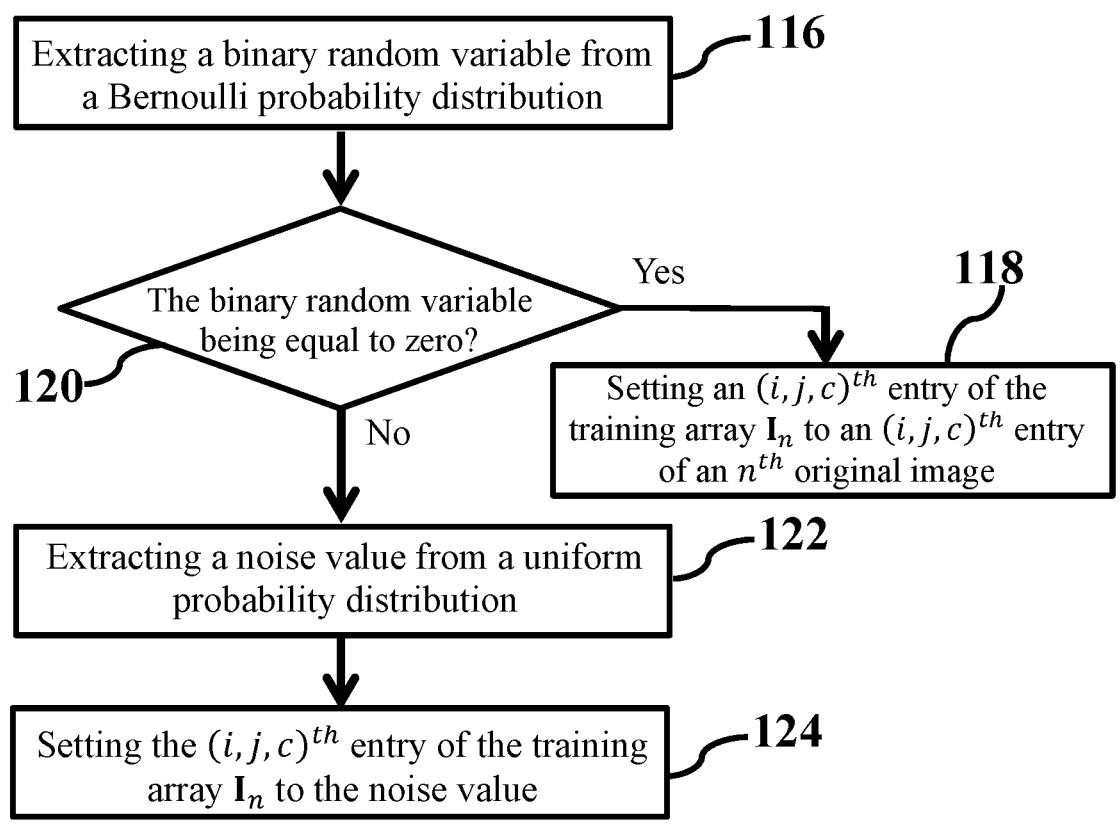
FIG. 1D shows a flowchart for obtaining a training array, consistent with one or more exemplary embodiments of the present disclosure.

With further detail with respect to step 114, FIG. 1D shows a flowchart for obtaining a training array, consistent with one or more exemplary embodiments of the present disclosure. In an exemplary embodiment, step 114 may include obtaining training array $I_n$ based on random variable p generated in step 112 discussed above. In an exemplary embodiment, obtaining training array $I_n$ may include extracting a binary random variable from a Bernoulli probability distribution (step 116), setting an $(i, j, c)^{th}$ entry of training array $I_n$ to an $(i, j, c)^{th}$ entry of an $n^{th}$ original image (step 118) responsive to the binary random variable being equal to 0 (step 120, Yes), extracting a noise value from a uniform probability distribution (step 122) responsive to the binary random variable being equal to 1 (step 120, No), and setting the $(i, j, c)^{th}$ entry of the training array $I_n$ to the noise value (step 124) where $1 \le i \le N_h$, $1 \le j \le N_w$, and $1 \le c \le C$.

In further detail with respect to step 116, in an exemplary embodiment, a parameter of the Bernoulli probability distribution may be equal to p. An exemplary Bernoulli probability distribution may provide a random variable including one of 0 and 1 values. When a parameter of an exemplary Bernoulli probability distribution is p, a random variable may take a value of 1 with probability p and the random variable may take a value of 0 with probability 1−p.

In an exemplary embodiment, step 118 may include setting the $(i, j, c)^{th}$ entry of training array $I_n$ to the $(i, j, c)^{th}$ entry of the $n^{th}$ original image. In an exemplary embodiment, $n^{th}$ training image 206 may include a noisy version of the $n^{th}$ original image. In an exemplary embodiment, $n^{th}$ training image 206 may be generated by corrupting the $n^{th}$ original image with an impulsive noise. An exemplary impulsive noise may corrupt each pixel of the $n^{th}$ original image with probability p. In contrast, in an exemplary embodiment, each pixel of $n^{th}$ training image 206 may be equal to a respective pixel of the $n^{th}$ original image with probability 1−p. In an exemplary embodiment, the $(i, j, c)^{th}$ entry of training array $I_n$ may be set to the $(i, j, c)^{th}$ entry of the $n^{th}$ original image responsive to the binary random variable being equal to 0.

For further detail regarding step 120, in an exemplary embodiment, the binary random variable may be equal to 1 with probability p. In an exemplary embodiment, when the binary random variable is 1, a respective pixel of $n^{th}$ training image 206 may be set to a noise value. An exemplary binary random variable may be equal to 0 with probability 1−p. In an exemplary embodiment, when the binary random variable is 0, a pixel of $n^{th}$ training image 206 may be set to a respective pixel of the $n^{th}$ original image.

In an exemplary embodiment, step 122 may include extracting the noise value from the uniform probability distribution. An exemplary random valued impulsive noise (RVIN) may change a value of a pixel in an exemplary image regardless of a value in a respective pixel of an original image. An exemplary RVIN may change a value of a pixel to a value that is in an intensity range of an exemplary original image. In other words, in an exemplary embodiment, a support set of the uniform probability distribution may be equal to an intensity range of the $n^{th}$ original image. As a result, in an exemplary embodiment, the noise value may be generated in the intensity range of the $n^{th}$ original image.

In an exemplary embodiment, step 124 may include setting the $(i, j, c)^{th}$ entry of the training array $I_n$ to the noise value. In an exemplary embodiment, the $(i, j, c)^{th}$ entry of training array $I_n$ may be set to the noise value responsive to the binary random variable being equal to 1. In an exemplary embodiment, the $n^{th}$ original image may be corrupted by RVIN, resulting in $n^{th}$ training image 206.

Referring again to FIGS. 1B and 2A, in an exemplary embodiment, step 108 may include initializing FCN 200 with a plurality of initial weights. In an exemplary embodiment, initializing FCN 200 may include generating plurality of initial weights. In an exemplary embodiment, generating the plurality of initial weights may include generating a plurality of random variables from a predetermined probability distribution. In an exemplary embodiment, the predetermined probability distribution may be determined by a designer of FCN 200 according to a required range of each of the plurality of initial weights. In an exemplary embodiment, the predetermined probability distribution may be selected from Gaussian or uniform probability distributions. In an exemplary embodiment, FCN 200 may include a plurality of convolutional layers 210. In an exemplary embodiment, a respective number of initial weights of the plurality of initial weights may be multiplied by an output of each respective convolutional layer of plurality of convolutional layers 210. In an exemplary embodiment, a respective multiplication result may be fed to a subsequent convolutional layer plurality of convolutional layers 210 until an output of FCN 200 is generated. Specifically, in an exemplary embodiment, each of the plurality of initial weights may include a respective coefficient of a respective convolutional filter in plurality of convolutional layers 210.

Figure 1E:
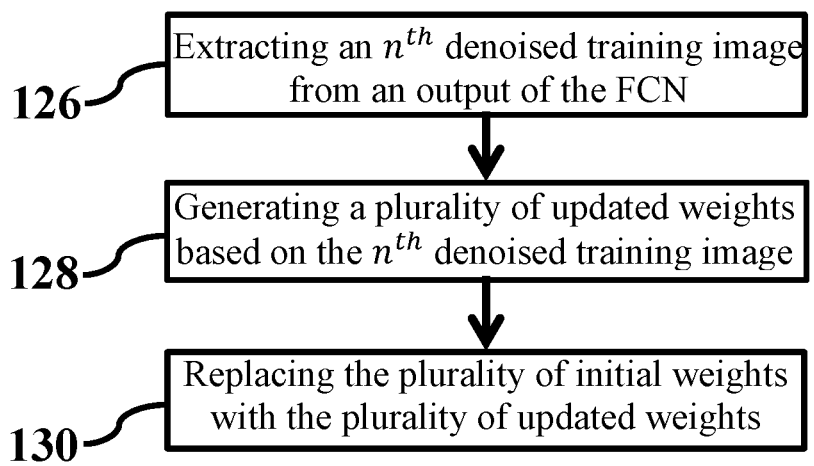
FIG. 1E shows a flowchart for repeating a first iterative process, consistent with one or more exemplary embodiments of the present disclosure.

For further detail with respect to step 110, FIG. 1E shows a flowchart for repeating a first iterative process, consistent with one or more exemplary embodiments of the present disclosure. In an exemplary embodiment, repeating a first iterative process may include extracting $n^{th}$ denoised training image 204 from an output of the FCN (step 126), generating a plurality of updated weights (step 128), and replacing the plurality of initial weights with the plurality of updated weights (step 130).

Figure 1F:
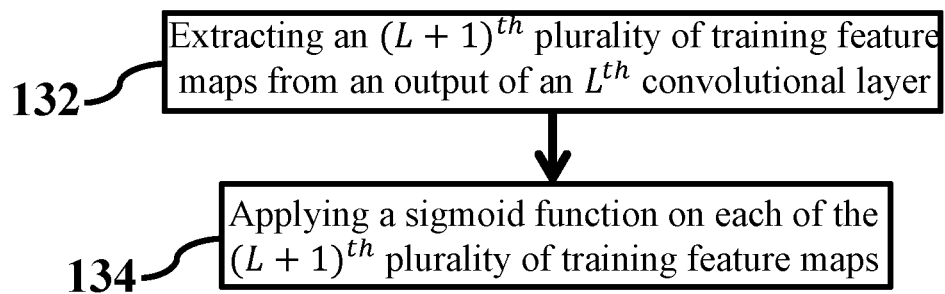
FIG. 1F shows a flowchart for applying an FCN on a training image, consistent with one or more exemplary embodiments of the present disclosure.

In further detail with regard to step 126, FIG. 1F shows a flowchart for applying an FCN on a training image, consistent with one or more exemplary embodiments of the present disclosure. Referring to FIGS. 1E, 1F, and 2A, in an exemplary embodiment, step 126 may include extracting $n^{th}$ denoised training image 204. In an exemplary embodiment, extracting $n^{th}$ denoised training image 204 may include applying FCN 200 on $n^{th}$ training image 206. In an exemplary embodiment, $n^{th}$ denoised training image 204 may include a denoised array $\hat{I}_n$ of size $N_h \times N_w \times C$. In an exemplary embodiment, applying FCN 200 on $n^{th}$ training image 206 may include extracting an $(L+1)^{th}$ plurality of training feature maps 212 from an output of an $L^{th}$ convolutional layer 214 of plurality of convolutional layers 210 (step 132) and applying a sigmoid function on each of the $(L+1)^{th}$ plurality of training feature maps (step 134) where L is a number of plurality of convolutional layers 210.

Figure 1G:
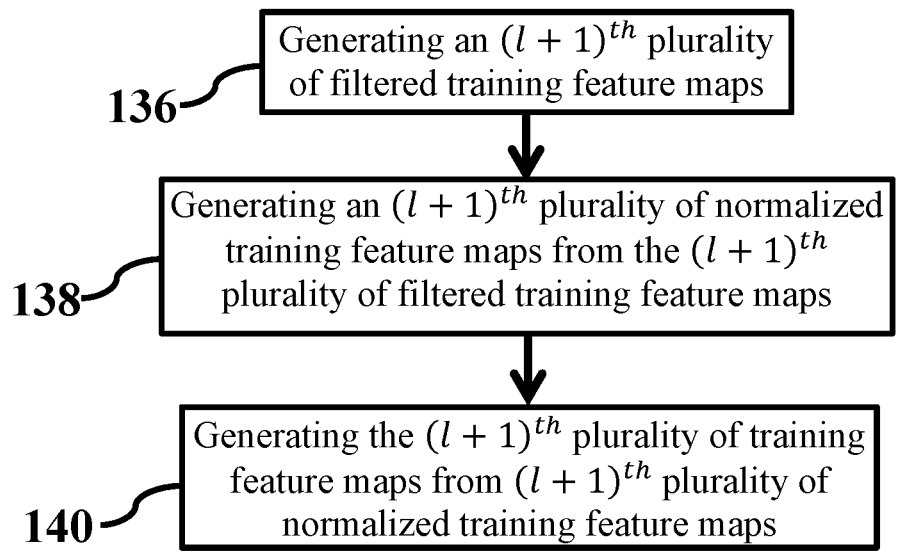
FIG. 1G shows a flowchart for obtaining a plurality of training feature maps, consistent with one or more exemplary embodiments of the present disclosure.

For further detail regarding step 132, FIG. 1G shows a flowchart for obtaining a plurality of training feature maps, consistent with one or more exemplary embodiments of the present disclosure. In an exemplary embodiment, extracting $(L+1)^{th}$ plurality of training feature maps 212 may include obtaining an $(l+1)^{th}$ plurality of training feature maps 216. In an exemplary embodiment, obtaining $(l+1)^{th}$ plurality of training feature maps 216 may include generating an $(l+1)^{th}$ plurality of filtered training feature maps (step 136), generating an $(l+1)^{th}$ plurality of normalized training feature maps (step 138), and generating $(l+1)^{th}$ plurality of training feature maps 216 (step 140), where $1 \leq l \leq L$. In an exemplary embodiment, $(l+1)^{th}$ plurality of training feature maps 216 may be obtained by applying an $l^{th}$ convolutional layer 219 of plurality of convolutional layers 210 on an $l^{th}$ plurality of training feature maps 220.

Figure 2B:
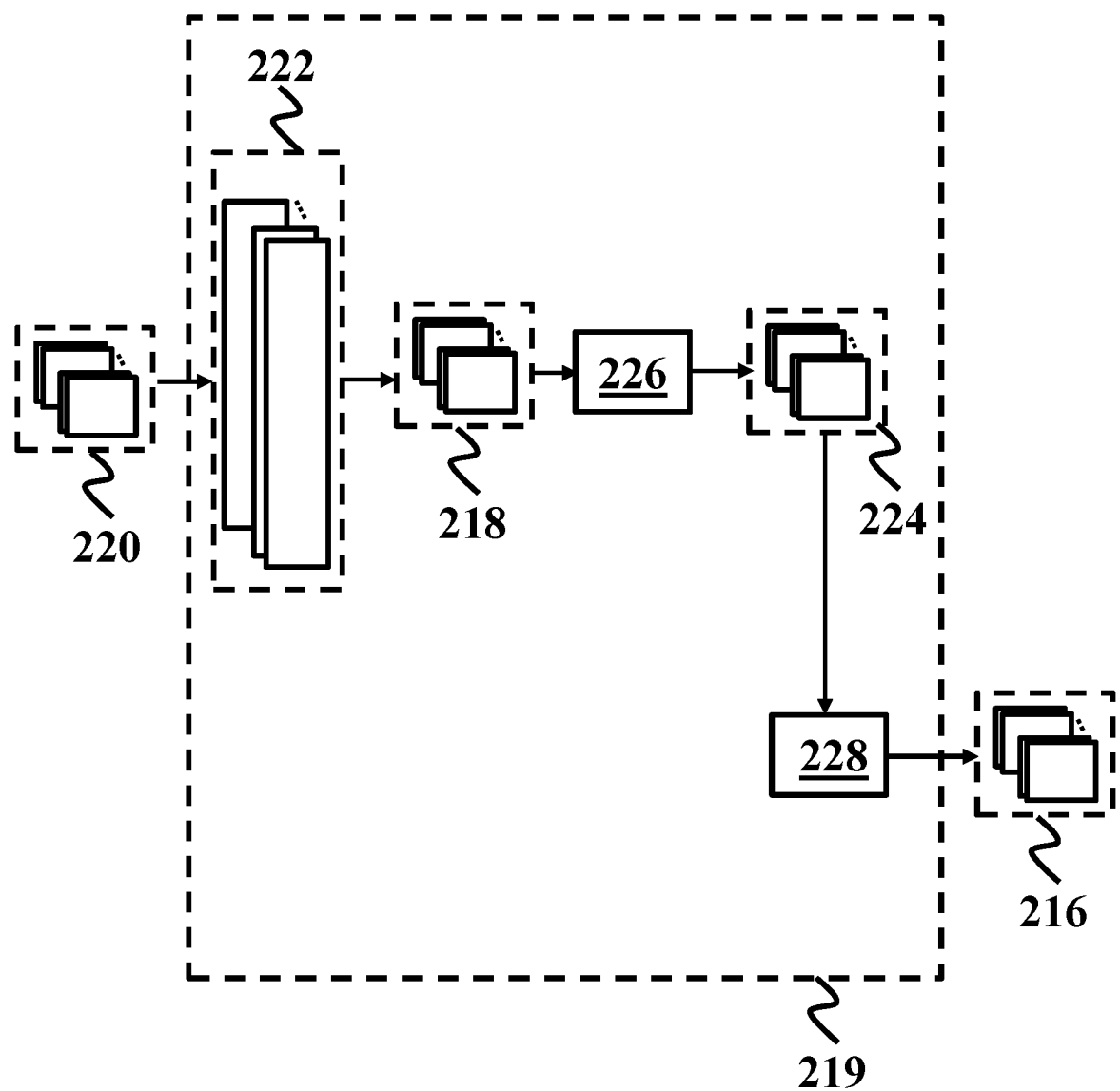
FIG. 2B shows a schematic of a convolutional layer, consistent with one or more exemplary embodiments of the present disclosure.

FIG. 2B shows a schematic of a convolutional layer, consistent with one or more exemplary embodiments of the present disclosure. Referring to FIGS. 1G, 2A, and 2B, in an exemplary embodiment, step 136 may include generating an $(l+1)^{th}$ plurality of filtered training feature maps 218. In an exemplary embodiment, $l^{th}$ convolutional layer 219 may include an $l^{th}$ plurality of filters 222. In an exemplary embodiment, generating $(l+1)^{th}$ plurality of filtered training feature maps 218 may include applying $l^{th}$ plurality of filters 222 on $l^{th}$ plurality of training feature maps 216. In an exemplary embodiment, a first ($1^{st}$) plurality of training feature maps may include plurality of training channels 208. In an exemplary embodiment, a number of $l^{th}$ plurality of filters 222 may be equal to $M_r$, where $$r = \left\lceil \frac{l}{R} \right\rceil, \lceil \cdot \rceil$$

is a ceiling operator, R is a positive integer, $$M_t < M_{t+1}, t \leq \left\lceil \frac{l}{2R} \right\rceil - 1, M_{s+1} < M_s, \text{ and } s \geq \left\lceil \frac{l}{2R} \right\rceil.$$

In an exemplary embodiment, a number of a plurality of filters in plurality of convolutional layers 210 may be symmetric, that is, a number of a plurality of filters may be increasing in lower convolutional layers and then, a number of a plurality of filters may be decreasing in higher convolutional layers. In an exemplary embodiment, a number of a plurality of filters in plurality of convolutional layers 210 may include 32, 64, 128, 256, 128, 64, and 32. In an exemplary embodiment, each R consecutive convolutional layers may include equal number of convolutional filters. In an exemplary embodiment, when R=3, plurality of convolutional layers 210 may include 3 consecutive convolutional layers with 32 convolutional filters, 3 consecutive convolutional layers with 64 convolutional filters and so on.

In an exemplary embodiment, step 138 may include generating an $(l+1)^{th}$ plurality of normalized training feature maps 224. In an exemplary embodiment, $l^{th}$ convolutional layer 219 may include a batch normalization process 226. In an exemplary embodiment, generating $(l+1)^{th}$ plurality of normalized training feature maps 224 may include applying batch normalization process 226 on $(l+1)^{th}$ plurality of filtered training feature maps 218. In an exemplary embodiment, each of $(l+1)^{th}$ plurality of normalized training feature maps 224 may be generated by applying batch normalization process 226 on a respective filtered training feature map of $(l+1)^{th}$ plurality of filtered training feature maps 218. In an exemplary embodiment, batch normalization process 226 may normalize $(l+1)^{th}$ plurality of filtered training feature maps 218 utilizing an average and a standard deviation of a set of $(l+1)^{th}$ plurality of filtered training feature maps 218 associated with plurality of training images 202. In batch normalization process, an exemplary set of $(l+1)^{th}$ plurality of filtered training feature maps 218 associated with each of plurality of training images 202 may be obtained. Afterwards, in an exemplary embodiment, an average and a standard deviation of the set of $(l+1)^{th}$ plurality of filtered training feature maps 218 may be obtained and all elements of the set of $(l+1)^{th}$ plurality of filtered training feature maps 218 may be normalized in accordance to the average and the standard deviation. Next, in an exemplary embodiment, all elements of the set of $(l+1)^{th}$ plurality of filtered training feature maps 218 may be scaled and shifted by a scale and a shift variable, which may be learned during training process. Therefore, in an exemplary embodiment, all elements of $(l+1)^{th}$ plurality of normalized training feature maps 224 may follow a normal distribution, which may considerably reduce a required time for training FCN 200.

In an exemplary embodiment, step 140 may include generating $(l+1)^{th}$ plurality of training feature maps 216. In an exemplary embodiment, $l^{th}$ convolutional layer may include an $l^{th}$ non-linear activation function 228. In an exemplary embodiment, generating $(l+1)^{th}$ plurality of training feature maps 216 may include implementing $l^{th}$ non-linear activation function 228 on each of $(l+1)^{th}$ plurality of normalized training feature maps 224. In an exemplary embodiment, implementing $l^{th}$ non-linear activation function 228 may include implementing one of a rectified linear unit (ReLU) function or an exponential linear unit (ELU) function. In an exemplary embodiment, implementing $l^{th}$ non-linear activation function 228 may include implementing other types of non-linear activation functions such as leaky ReLU, scaled ELU, parametric ReLU, etc.

Referring again to FIGS. 1F and 2A, in an exemplary embodiment, step 134 may include applying a sigmoid function 230 on each of $(L+1)^{th}$ plurality of training feature maps 212. In an exemplary embodiment, a domain of sigmoid function 230 may include all real numbers. In an exemplary embodiment, a return value of sigmoid function 230 may be in an interval (0,1). In an exemplary embodiment, sigmoid function 230 may be applied on each entry of $(L+1)^{th}$ plurality of training feature maps 212. As a result, in an exemplary embodiment, each entry of $n^{th}$ denoised training image 204 may include a value in an interval (0,1). In an exemplary embodiment, each entry of $n^{th}$ denoised training image 204 may determine a value of a respective pixel of $n^{th}$ denoised training image 204. Therefore, each entry of $n^{th}$ denoised training image 204 may be scaled to an intensity range of the $n^{th}$ original image. In an exemplary embodiment, each entry may be represented by 8 bits and a return value of sigmoid function 230 may be scaled to an integer between 0 and 255.

Referring again to FIG. 1E, in an exemplary embodiment, step 128 may include generating a plurality of updated weights. In an exemplary embodiment, generating a plurality of updated weights may include minimizing a loss function including $\sum_{n=1}^{N}|I_n - \hat{I}_n|$ where |.| is an L1 norm. An exemplary impulsive noise may only impact a subset of the $n^{th}$ original image. As a result, an estimation of the impulsive noise may be sparse, that is, $I_n - \hat{I}_n$ may include a sparse array. In an exemplary embodiment, sparsity of the impulsive noise may be leveraged for enhancing a reconstruction quality of FCN 200. In an exemplary embodiment, to enhance the reconstruction quality, a measure of impulsive noise sparsity may be considered in training FCN 200. An exemplary measure of sparsity of an array may include an L0 norm of the array. However, in an exemplary embodiment, L0 norm may not be differentiable, and therefore, may not be utilized in training FCN 200. A differentiable measure of sparsity may include an L1 norm of an array. As a result, in an exemplary embodiment, the loss function may include $|I_n - \hat{I}_n|$ to model a sparsity of an estimation of the impulsive noise. In an exemplary embodiment, impulsive noise may be present in images captured by imaging devices such as magnetic resonance imaging (MRI) and computed tomography (CT) devices as well as charge-coupled device (CCD) and complementary metal oxide semiconductor (CMOS) sensors. Since exemplary impulsive noises may be sparse, utilizing a sparsity measure of impulsive noises may significantly reduce impact of impulsive noise.

In an exemplary embodiment, minimizing the loss function may be performed utilizing a gradient descent method. In an exemplary gradient descent method, a plurality of adjustment values may be generated. Each of the plurality of adjustment values may be proportional to a gradient of the loss function associated with each of the plurality of initial weights. The plurality of adjustment values may be obtained utilizing a back propagation algorithm. In an exemplary embodiment, each of the plurality of updated weights may be associated with a respective initial weight of the plurality of initial weights. Specifically, in an exemplary embodiment, the plurality of updated weights may be obtained by adding each of the plurality of adjustment values to a respective initial weight of the plurality of initial weights.

In an exemplary embodiment, minimizing the loss function may include minimizing a total loss function defined by:

$$L_{total} = \lambda_1 L_1 + \lambda_2 L_2 + \lambda_3 L_3 + \lambda_4 L_4 \quad \text{Equation (1)}$$

where $L_1 = \sum_{n=1}^{N}(\hat{I}_n - \tilde{I}_n)^2$ is a mean squared error function, $\tilde{I}_n$ is an original array of size $N_h \times N_w \times C$ of the $n^{th}$ original image, $$L_2 = \frac{1}{N}\sum_{n=1}^{N}|\hat{I}_n - \tilde{I}_n|$$

is a mean absolute error function, $$L_3 = \frac{1}{N}\sum_{n=1}^{N}|I_n - \hat{I}_n|$$

is a noise sparsity measure, $$L_4 = \frac{1}{N}\sum_{n=1}^{N}\frac{1 - SSIM(\hat{I}_n, \tilde{I}_n)}{2}$$

is a structural dissimilarity index measure, $SSIM(\hat{I}_n, \tilde{I}_n)$ is a structural similarity index measure of $n^{th}$ denoised training image 204 and the $n^{th}$ original image, and each of $\lambda_1$, $\lambda_2$, $\lambda_3$, and $\lambda_4$ is a respective non-negative coefficient. In an exemplary embodiment, a value of each of $\lambda_1$, $\lambda_2$, $\lambda_3$, and $\lambda_4$ may be determined so that values of $\lambda_i L_i$ for all i are in a same order. In an exemplary embodiment, a value of each of $\lambda_1$, $\lambda_2$, $\lambda_3$, and $\lambda_4$ may be obtained empirically.

In an exemplary embodiment, the total loss function may be defined such that an output of FCN 200 is a denoised version of $n^{th}$ training image 206, that is, $n^{th}$ denoised training image 204. In contrast, in an exemplary embodiment, a residual loss function may be defined instead of the total loss function so that an output of an FCN is an estimation of an impulsive noise that is corrupting $n^{th}$ training image 206. In an exemplary embodiment, updating the plurality of initial weights by minimizing the residual loss function may result in a residual FCN.

In an exemplary embodiment, step 130 may include replacing the plurality of initial weights with the plurality of updated weights. In an exemplary embodiment, a value of the loss function may be minimized utilizing the plurality of updated weights. In an exemplary embodiment, in following iterations of the first iteration process, the plurality of updated weights may be utilized for generating $n^{th}$ denoised training image 204 instead of utilizing the plurality of initial weights.

Figure 1H:
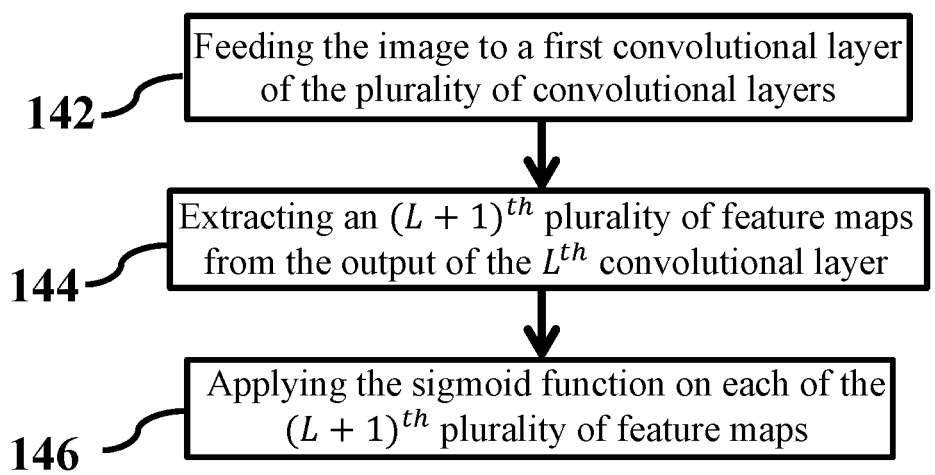
FIG. 1H shows a flowchart for applying an FCN on an image, consistent with one or more exemplary embodiments of the present disclosure.

FIG. 1H shows a flowchart for applying an FCN on an image, consistent with one or more exemplary embodiments of the present disclosure. Referring to FIGS. 1A, 1H, and 2A, in an exemplary embodiment, step 104 may include generating a reconstructed image by applying FCN 200 on the image. In an exemplary embodiment, applying FCN 200 on the image may include feeding the image to a first ($1^{st}$) convolutional layer 232 of plurality of convolutional layers 210 (step 142), extracting an $(L+1)^{th}$ plurality of feature maps from the output of $L^{th}$ convolutional layer 214 (step 144), and applying sigmoid function 230 on each of the $(L+1)^{th}$ plurality of feature maps (step 146). In an exemplary embodiment, the reconstructed image may be generated utilizing the one or more processors.

In further detail with respect to step 142, in an exemplary embodiment, the image may include a first ($1^{st}$) plurality of feature maps. Therefore, in an exemplary embodiment, feeding the image to a first ($1^{st}$) convolutional layer 232 may include feeding first ($1^{st}$) plurality of feature maps to first ($1^{st}$) convolutional layer 232.

For further detail with regard to step 144, in an exemplary embodiment, extracting an $(L+1)^{th}$ plurality of feature maps from the output of $L^{th}$ convolutional layer 214 may be similar to extracting $(L+1)^{th}$ plurality of feature maps 212 from the output of $L^{th}$ convolutional layer 214. For further detail with regard to step 146, in an exemplary embodiment, applying sigmoid function 230 on each of the $(L+1)^{th}$ plurality of feature maps may be similar to applying sigmoid function 230 on each of the $(L+1)^{th}$ plurality of training feature maps.

In an exemplary embodiment, method 100 may further include obtaining the image from an image source. In an exemplary embodiment, the image may be obtained utilizing an imaging device, that is, the image source may include the imaging device. In an exemplary embodiment, an impulsive noise may corrupt the image due to inefficiencies of the imaging device. An exemplary Impulsive noise may be referred to as a type of noise that randomly changes pixel values of images to values that are independent of original pixel values. An exemplary imaging device may introduce an impulsive noise due to corrupted pixel elements in sensors of a camera. Exemplary imaging devices that are prone to impulsive noise may include medical imaging devices such as MRICT devices as well as CCD and CMOS sensors. In an exemplary embodiment, the impulsive noise may corrupt the image when the image is written on or read from a memory due to faulty memory locations in the memory. In an exemplary embodiment, captured images of an imaging device may be sent to a processor that implements method 100. In an exemplary embodiment, an impulsive noise may corrupt captured images in transmission of captured images from the imaging device to the processor.

In an exemplary embodiment, method 100 may further include generating a denoised image (step 148). In an exemplary embodiment, the denoised image may be generated utilizing the one or more processors. In an exemplary embodiment, a reconstruction quality of method 100 may be enhanced by applying signal-processing techniques on the reconstructed image. In an exemplary embodiment, an iterative method may be applied on an output of FCN 200, that is, the reconstructed image. In an exemplary embodiment, the denoised image may include a denoised array $\bar{I}_{\tilde{q}}$. In an exemplary embodiment, generating the denoised image may include repeating a second iterative process until a second termination condition is satisfied where $\tilde{q}$ is a total number of iterations of the second iterative process when the second termination condition is satisfied.

Figure 1I:
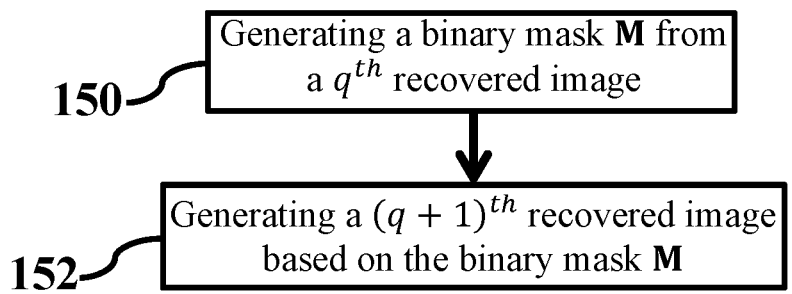
FIG. 1I shows a flowchart for a second iterative process, consistent with one or more exemplary embodiments of the present disclosure.

FIG. 1I shows a flowchart for a second iterative process, consistent with one or more exemplary embodiments of the present disclosure. In an exemplary embodiment, repeating the second iterative process may include generating a binary mask M from a $q^{th}$ recovered image (step 150) and generating a $(q+1)^{th}$ recovered image (step 152). In an exemplary embodiment, the $q^{th}$ recovered image may include a recovered array $\bar{I}_q$ of size $N_h \times N_w \times C$ where q is an iteration number of the second iterative process. In an exemplary embodiment, repeating the second iterative process may include repeating the second iterative process until one of an iteration condition and a distance condition is satisfied. In an exemplary embodiment, the iteration condition may include $q \geq Q$, where Q is a maximum number of iterations. In an exemplary embodiment, the distance condition may include $\|\bar{I}_q - \bar{I}_{q-1}\|_F \leq \delta$, where $\|.\|_F$ is a Frobenius norm and $\delta$ is a termination threshold.

Figure 1J:
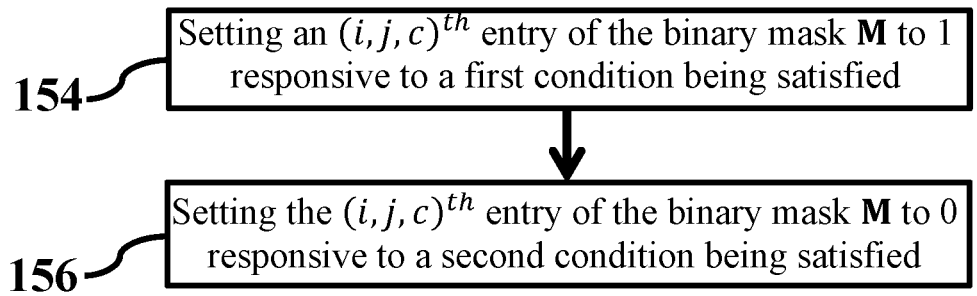
FIG. 1J shows a flowchart for generating a binary mask, consistent with one or more exemplary embodiments of the present disclosure.

In further detail with respect to step 150, FIG. 1J shows a flowchart for generating a binary mask, consistent with one or more exemplary embodiments of the present disclosure. In an exemplary embodiment, generating binary mask M may include setting an $(i, j, c)^{th}$ entry of binary mask M to 1 responsive to a first condition being satisfied (step 154) and setting the $(i, j, c)^{th}$ entry of binary mask M to 0 responsive to a second condition being satisfied (step 156).

For further detail regarding step 154, in an exemplary embodiment, binary mask M may highlight positions of pixels that may be subjected to an impulsive noise. In an exemplary embodiment, the image may include an image array I of size $N_h \times N_w \times C$. In an exemplary embodiment, recovered array $\bar{I}_q$ may include a denoised version of image array I. As a result, a difference $I - \bar{I}_q$ may include an estimation of the impulsive noise. Therefore, in an exemplary embodiment, a magnitude of an $(i, j, c)^{th}$ entry in $I - \bar{I}_q$ may be larger than a threshold when the impulsive noise corrupts a $(i, j, c)^{th}$ pixel of the image. In an exemplary embodiment, an $(i, j, c)^{th}$ entry of binary mask M may be equal to 1 when the $(i, j, c)^{th}$ entry of the image is not corrupted by the impulsive noise. In an exemplary embodiment, an $(i, j, c)^{th}$ entry of binary mask M may be to 1 responsive to a first condition being satisfied. In an exemplary embodiment, the first condition may be defined according to $|I-\bar{I}_q|_{i,j,c} \leq \epsilon$ where $|I-\bar{I}_q|_{i,j,c}$ is an $(i, j, c)^{th}$ entry of $|I-\bar{I}_q|$, and $\epsilon$ is a noise threshold. In an exemplary embodiment, a reconstruction quality of the second iterative process may increase as iteration number q increases. As a result, in an exemplary embodiment, noise threshold $\epsilon$ may decrease in subsequent iterations to detect more noisy pixels in binary mask M. In an exemplary embodiment, in the second iterative process, a $q^{th}$ noise threshold $\epsilon_q$ may be considered instead of noise threshold $\epsilon$, where $\epsilon_{q+1} \leq \epsilon_q$.

In an exemplary embodiment, step 156 may include setting the $(i, j, c)^{th}$ entry of binary mask M to 0 responsive to a second condition being satisfied. In an exemplary embodiment, the $(i, j, c)^{th}$ entry of binary mask M may be equal to 0 when the $(i, j, c)^{th}$ entry of the image is corrupted by an impulsive noise. In an exemplary embodiment, the second condition may be defined according to $|I-\bar{I}_q|_{i,j,c} > \epsilon$.

Figure 1K:
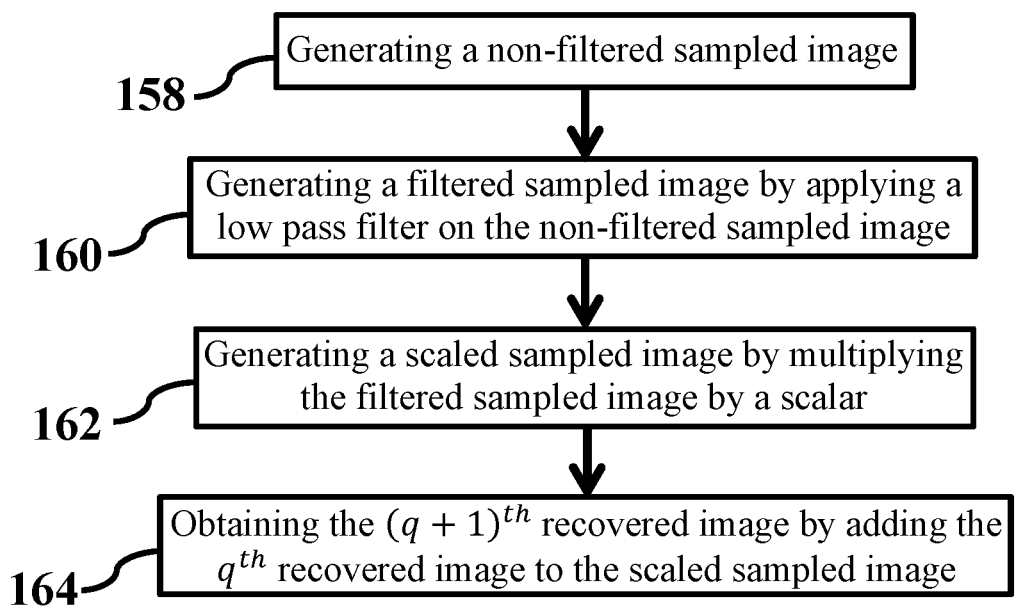
FIG. 1K shows a flowchart for generating a recovered image, consistent with one or more exemplary embodiments of the present disclosure.

For further detail with respect to step 152, FIG. 1K shows a flowchart for generating a recovered image, consistent with one or more exemplary embodiments of the present disclosure. Referring to FIGS. 1I and 1K, in an exemplary embodiment, step 152 may include generating the $(q+1)^{th}$ recovered image based on binary mask M. In an exemplary embodiment, a first ($1^{st}$) recovered image may include the reconstructed image. In an exemplary embodiment, generating the $(q+1)^{th}$ recovered image may include generating a non-filtered sampled image (step 158), generating a filtered sampled image by applying a low pass filter on the non-filtered sampled image (step 160), generating a scaled sampled image by multiplying the filtered sampled image by a scalar (step 162), and obtaining the $(q+1)^{th}$ recovered image by adding the $q^{th}$ recovered image to the scaled sampled image (step 164).

In further detail with regard to step 158, in an exemplary embodiment, the non-filtered sampled image may include a sampled array S of size $N_h \times N_w \times C$. In an exemplary embodiment, the non-filtered sampled image may be generated according to an operation defined by $S=(I-I_q) \odot M$ where $\odot$ is an element-wise product operator. In an exemplary embodiment, sampled array S may be utilized for recovering a set of missing samples in image array I.

In an exemplary embodiment, step 160 may include generating a filtered sampled image by applying a low pass filter on the non-filtered sampled image. In an exemplary embodiment, the non-filtered sampled image may include high frequency components of the impulsive noise. In an exemplary embodiment, to enhance a reconstruction quality of an iterative method of step 148, a low pass filter may be applied on sampled array S. An exemplary low pass filter may highlight low-frequency components of the image in sampled array S and also may attenuate high-frequency components of the impulsive noise in sampled array S. As a result, a noise power of the filtered sampled image may be less than a noise power of the non-filtered sampled image. In an exemplary embodiment, applying the low pass filter may include applying an exponential filter on the non-filtered sampled image. In an exemplary embodiment, a one dimensional smoothing kernel of the exponential filter may be defined according to $-ae^{-|x|^a}$ where a is a positive constant and x determines a location of a respective pixel in the non-filtered sampled image.

In an exemplary embodiment, step 162 may include generating a scaled sampled image by multiplying the filtered sampled image by a scalar. In an exemplary embodiment, multiplying the filtered sampled image by the scalar may facilitate a convergence of the iterative method of step 148. In an exemplary embodiment, the scalar may be smaller than 2.

In an exemplary embodiment, step 164 may include obtaining the $(q+1)^{th}$ recovered image by adding the $q^{th}$ recovered image to the scaled sampled image. In an exemplary embodiment, adding the $q^{th}$ recovered image to the scaled sampled image may enhance a reconstruction quality of the image through recovering a set of missing samples of the image.

Figure 3:
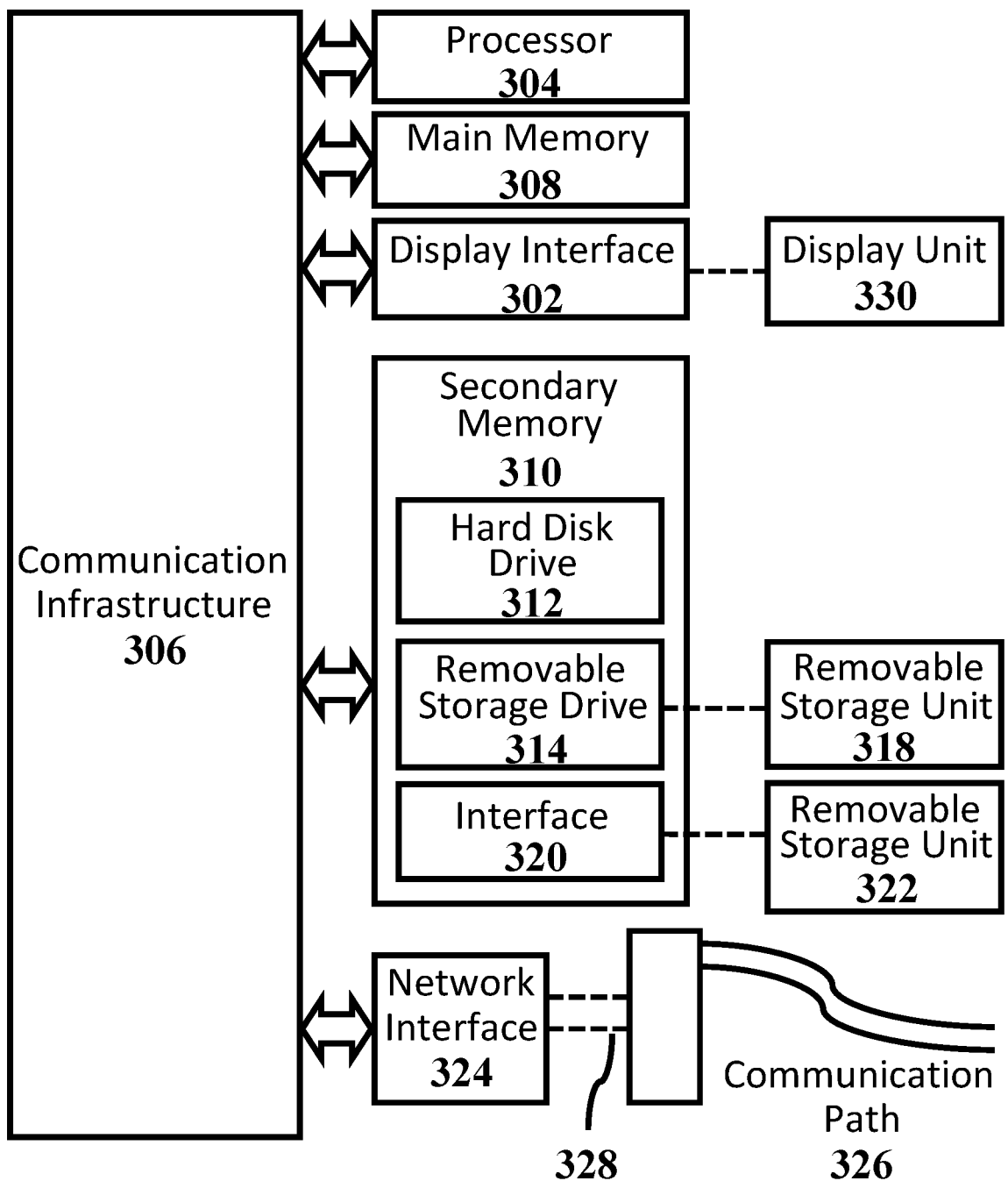
FIG. 3 shows a high-level functional block diagram of a computer system, consistent with one or more exemplary embodiments of the present disclosure.

FIG. 3 shows an example computer system 300 in which an embodiment of the present invention, or portions thereof, may be implemented as computer-readable code, consistent with exemplary embodiments of the present disclosure. For example, different steps of method 100 may be implemented in computer system 300 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-2B.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 300. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 304 may be a special purpose (e.g., a graphical processing unit) or a general-purpose processor device. As will be appreciated by persons skilled in the relevant art, processor device 304 may also be a single processor in a multi-core/multiprocessor system, such system operating alone, or in a cluster of computing devices operating in a cluster or server farm. Processor device 304 may be connected to a communication infrastructure 306, for example, a bus, message queue, network, or multi-core message-passing scheme.

In an exemplary embodiment, computer system 300 may include a display interface 302, for example a video connector, to transfer data to a display unit 330, for example, a monitor. Computer system 300 may also include a main memory 308, for example, random access memory (RAM), and may also include a secondary memory 310. Secondary memory 310 may include, for example, a hard disk drive 312, and a removable storage drive 314. Removable storage drive 314 may include a floppy disk drive, a magnetic tape drive, an optical disk drive, a flash memory, or the like. Removable storage drive 314 may read from and/or write to a removable storage unit 318 in a well-known manner. Removable storage unit 318 may include a floppy disk, a magnetic tape, an optical disk, etc., which may be read by and written to by removable storage drive 314. As will be appreciated by persons skilled in the relevant art, removable storage unit 318 may include a computer usable storage medium having stored therein computer software and/or data.

In alternative implementations, secondary memory 310 may include other similar means for allowing computer programs or other instructions to be loaded into computer system 300. Such means may include, for example, a removable storage unit 322 and an interface 320. Examples of such means may include a program cartridge and cartridge interface (such as that found in video game devices), a removable memory chip (such as an EPROM, or PROM) and associated socket, and other removable storage units 322 and interfaces 320 which allow software and data to be transferred from removable storage unit 322 to computer system 300.

Computer system 300 may also include a communications interface 324. Communications interface 324 allows software and data to be transferred between computer system 300 and external devices. Communications interface 324 may include a modem, a network interface (such as an Ethernet card), a communications port, a PCMCIA slot and card, or the like. Software and data transferred via communications interface 324 may be in the form of signals, which may be electronic, electromagnetic, optical, or other signals capable of being received by communications interface 324. These signals may be provided to communications interface 324 via a communications path 326. Communications path 326 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 318, removable storage unit 322, and a hard disk installed in hard disk drive 312. Computer program medium and computer usable medium may also refer to memories, such as main memory 308 and secondary memory 310, which may be memory semiconductors (e.g. DRAMs, etc.).

Computer programs (also called computer control logic) are stored in main memory 308 and/or secondary memory 310. Computer programs may also be received via communications interface 324. Such computer programs, when executed, enable computer system 300 to implement different embodiments of the present disclosure as discussed herein. In particular, the computer programs, when executed, enable processor device 304 to implement the processes of the present disclosure, such as the operations in method 100 illustrated by flowchart 100 of FIG. 1A and flowchart 102 of FIG. 1B discussed above. Accordingly, such computer programs represent controllers of computer system 300. Where an exemplary embodiment of method 100 is implemented using software, the software may be stored in a computer program product and loaded into computer system 300 using removable storage drive 314, interface 320, and hard disk drive 312, or communications interface 324.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

EXAMPLE

In this example, a performance of a method (similar to method 100) for denoising an image is demonstrated. Different steps of the method are implemented utilizing an FCN (similar to FCN 200). In training phase, 16 patches of 64×64 images are extracted from each of 4000 pairs of training images and original images, that is, $N_h=N_w=64$. Moreover, each of original images and training images are grayscale images, that is, C=1. In each epoch, 32 training images (similar to plurality of training images 202) are fed to the FCN.

The FCN includes 21 convolutional layers (similar to plurality of convolutional layers 210). In the FCN, each three consecutive convolutional layers include equal number of filters, that is, R=3. Number of plurality of filters (similar to $1^{th}$ plurality of filters 222) are about $M_1=32$, $M_2=64$, $M_3=128$, $M_4=256$, $M_5=128$, $M_6=64$, and $M_7=32$.

An impulsive noise is added to each training image (similar to $n^{th}$ training image 206). A level of the impulsive noise is varying from about 0.1 to about 0.7, that is, $p_l=0.1$ and $p_u=0.7$. A value of impulsive noise is extracted from a truncated Gaussian distribution with a mean about 0.6 and a standard deviation about 0.3. A loss function (similar to the total loss function of Equation (1)) is minimized in training phase. Values of non-negative weights are about $\lambda_1=1$, $\lambda_2=0.1$, $\lambda_3=0.075$, $\lambda_4=0.015$. Adam optimizer that is a gradient descent-based optimizer is utilized for minimizing the total loss function. A parameter a of an exponential filter is set to about 1.2. A value of termination threshold $\delta$ is set to about 0.02.

A performance of the FCN is evaluated in terms of peak signal to noise ratio (PSNR) and structural similarity index metric (SSIM). To evaluate the performance of the FCN, each of a plurality of test images are generated with various densities of the impulsive noise. Then, an average PSNR and SSIM of outputs of the FCN are computed. Table 1 compares PSNR of the FCN with that of a CNN-32 and a CNN-64. The CNN-32 is an FCN with the same number of convolutional filters in all convolutional layers, that is, $M_i=32$ for all i. Similarly, CNN-64 is an FCN with the same number of convolutional filters in all convolutional layers, that is, $M_i=64$ for all i.

TABLE 1

PSNR of different neural networks in different noise densities

| | Noise Density | | | | |
|---|---|---|---|---|---|
| | 10% | 20% | 30% | 40% | 50% |
| CNN-32 | 37.94 | 34.79 | 32.36 | 30.27 | 28.31 |
| CNN-64 | 39.02 | 35.55 | 32.95 | 30.76 | 28.76 |
| FCN | 39.83 | 36.09 | 33.34 | 31.03 | 28.94 |

As Table 1 shows, the FCN achieves higher PSNR than 32-CNN and 64-CNN in each of noise densities. Table 2 compares SSIM of the FCN with that of a CNN-32 and a CNN-64. As Table 2 shows, the FCN achieves higher SSIM than 32-CNN and 64-CNN in each of noise densities.

TABLE 2

SSIM of different neural networks in different noise densities

| | Noise Density | | | | |
|---|---|---|---|---|---|
| | 10% | 20% | 30% | 40% | 50% |
| CNN-32 | 0.9899 | 0.9799 | 0.9658 | 0.9460 | 0.9176 |
| CNN-64 | 0.9922 | 0.9830 | 0.9699 | 0.9512 | 0.9247 |
| FCN | 0.9931 | 0.9848 | 0.9722 | 0.9540 | 0.9275 |

A PSNR of the method is shown for different well-known test images in Table 3. A PSNR of the FCN is computed from a reconstructed image (similar to the reconstructed image in step 104). A PSNR of the method is computed from a denoised image (similar to the denoised image in method 100). Table 3 shows that an iterative method (similar to the second iterative process in step 148) increases a PSNR achieved by the FCN.

TABLE 3

| PSNR of the method and the FCN in different noise densities | | | | | | | |
|---|---|---|---|---|---|---|---|
| Noise Density | | 5% | 10% | 20% | 30% | 40% | 50% |
| Lena | FCN | 43.78 | 42.03 | 39.86 | 38.20 | 36.72 | 34.28 |
|  | Method | 45.49 | 42.92 | 40.19 | 38.33 | 36.80 | 34.31 |
| Peppers | FCN | 40.74 | 38.78 | 36.88 | 35.49 | 34.37 | 32.99 |
|  | Method | 41.70 | 39.36 | 37.08 | 35.56 | 34.42 | 33.00 |
| Goldhill | FCN | 41.41 | 39.24 | 36.79 | 34.98 | 33.15 | 31.71 |
|  | Method | 42.63 | 39.84 | 36.96 | 35.03 | 33.19 | 31.72 |

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for denoising an image, the method comprising:
    training, utilizing one or more processors, a fully convolutional neural network (FCN) by:
        generating an $n^{th}$ training image of a plurality of training images, the $n^{th}$ training image comprising a plurality of training channels and a training array $I_n$ of size $N_h \times N_w \times C$, where:
            $N_h$ is a height of the $n^{th}$ training image,
            $N_w$ is a width of the $n^{th}$ training image,
            C is a number of the plurality of training channels,
            $1 \leq n \leq N$, and
            N is a number of the plurality of training images;
        initializing the FCN with a plurality of initial weights; and
        repeating a first iterative process until a first termination condition is satisfied, comprising:
            extracting an $n^{th}$ denoised training image from an output of the FCN by applying the FCN on the $n^{th}$ training image, the $n^{th}$ denoised training image comprising a denoised array $\hat{I}_n$ of size $N_h \times N_w \times C$;
            generating a plurality of updated weights by minimizing a loss function comprising $\Sigma_{n=1}^{N} \|I_n - \hat{I}_n\|$ where $|.|$ is an L1 norm, each updated weight of the plurality of updated weights associated with a respective initial weight of the plurality of initial weights; and
            replacing the plurality of initial weights with the plurality of updated weights; and
    generating, utilizing the one or more processors, a reconstructed image by applying the FCN on the image.

2. The method of claim 1, wherein generating the $n^{th}$ training image comprises:
    extracting a random variable p from a noise probability distribution, a support set of the noise probability distribution comprising a lower bound $p_l$ and an upper bound $p_u$ where $0 \leq p_l \leq p_u \leq 1$, $$\frac{p_l + p_u}{2} \leq \mu,$$

and $\mu$ is a mean of the noise probability distribution; and obtaining the training array $I_n$ by:
extracting a binary random variable from a Bernoulli probability distribution, a parameter of the Bernoulli probability distribution equal to p;
setting an (i, j, c)$^{th}$ entry of the training array $I_n$ to an (i, j, c)$^{th}$ entry of an $n^{th}$ original image responsive to the binary random variable being equal to 0 where $1 \leq i \leq N_h$, $1 \leq j \leq N_w$, and $1 \leq c \leq C$;
extracting a noise value from a uniform probability distribution, a support set of the uniform probability distribution equal to an intensity range of the $n^{th}$ original image; and
setting the (i, j, c)$^{th}$ entry of the training array $I_n$ to the noise value responsive to the binary random variable being equal to 1.

3. The method of claim 2, wherein extracting the random variable p from the noise probability distribution comprises extracting the random variable p from a truncated Gaussian probability distribution.

4. The method of claim 1, wherein applying the FCN on the $n^{th}$ training image comprises:
extracting an (L+1)$^{th}$ plurality of training feature maps from an output of an $L^{th}$ convolutional layer of a plurality of convolutional layers associated with the FCN where L is a number of the plurality of convolutional layers, extracting the (L+1)$^{th}$ plurality of training feature maps comprising obtaining an (l+1)$^{th}$ plurality of training feature maps where $1 \leq l \leq L$, by:
generating an (l+1)$^{th}$ plurality of filtered training feature maps by applying an $l^{th}$ plurality of filters on an $l^{th}$ plurality of training feature maps, a first plurality of training feature maps comprising the plurality of training channels, a number of the $l^{th}$ plurality of filters equal to $M_r$, where:

$$r = \left\lceil \frac{l}{R} \right\rceil \text{ where } \lceil . \rceil$$

is a ceiling operator,
R is a positive integer,
$M_r < M_{r+1}$ where $$t \leq \left\lceil \frac{l}{2R} \right\rceil - 1,$$

and
$M_{s+1} < M_s$ where $$s \geq \left\lceil \frac{l}{2R} \right\rceil;$$

generating an (l+1)$^{th}$ plurality of normalized training feature maps by applying a batch normalization process on the (l+1)$^{th}$ plurality of filtered training feature maps, each normalized training feature map of the (l+1)$^{th}$ plurality of normalized training feature maps associated with a respective filtered training feature map of the (l+1)$^{th}$ plurality of filtered training feature maps; and
generating the (l+1)$^{th}$ plurality of training feature maps by implementing an $l^{th}$ non-linear activation function on each of the (l+1)$^{th}$ plurality of normalized training feature maps; and
applying a sigmoid function on each of the (L+1)$^{th}$ plurality of training feature maps.

5. The method of claim 4, wherein applying the FCN on the image comprises:
feeding the image to a first convolutional layer of the plurality of convolutional layers;
extracting an (L+1)$^{th}$ plurality of feature maps from the output of the $L^{th}$ convolutional layer by obtaining an (l+1)$^{th}$ plurality of feature maps, comprising:
generating an (l+1)$^{th}$ plurality of filtered feature maps by applying the $l^{th}$ plurality of filters on an $l^{th}$ plurality of feature maps, a first plurality of feature maps comprising a plurality of channels of the image;
generating an (l+1)$^{th}$ plurality of normalized feature maps by applying the batch normalization process on the (l+1)$^{th}$ plurality of filtered feature maps, each normalized feature map of the (l+1)$^{th}$ plurality of normalized feature maps associated with a respective filtered feature map of the (l+1)$^{th}$ plurality of filtered feature maps; and
generating the (l+1)$^{th}$ plurality of feature maps by implementing the $l^{th}$ non-linear activation function on each of the (l+1)$^{th}$ plurality of normalized feature maps; and
applying the sigmoid function on each of the (L+1)$^{th}$ plurality of feature maps.

6. The method of claim 1, wherein minimizing the loss function comprises minimizing a total loss function defined by:

$$L_{total} = \lambda_1 L_1 + \lambda_2 L_2 + \lambda_3 L_3 + \lambda_4 L_4,$$

where:

$$L_1 = \frac{1}{N} \sum_{n=1}^{N} (\hat{I}_n - \tilde{I}_n)^2,$$

$\tilde{I}_n$ is an original array of size $N_h \times N_w \times C$ associated with the $n^{th}$ original image, $$L_2 = \frac{1}{N} \sum_{n=1}^{N} |\hat{I}_n - \tilde{I}_n|,$$

$$L_3 = \frac{1}{N} \sum_{n=1}^{N} |I_n - \hat{I}_n|,$$

$$L_4 = \frac{1}{N} \sum_{n=1}^{N} \frac{1 - SSIM(\hat{I}_n, \tilde{I}_n)}{2},$$

SSIM($\hat{I}_n$, $\tilde{I}_n$) is a structural similarity index measure of the $n^{th}$ denoised training image and the $n^{th}$ original image, and
each of $\lambda_1$, $\lambda_2$, $\lambda_3$, and $\lambda_4$ is a respective non-negative coefficient.

7. The method of claim 1, further comprising generating, utilizing the one or more processors, a denoised image comprising a denoised array $\bar{I}_{\tilde{q}}$ by repeating a second iterative process until a second termination condition is satisfied, where q̃ is a total number of iterations of the second iterative process when the second termination condition is satisfied, repeating the second iterative process comprising:
   generating a binary mask M from a $q^{th}$ recovered image comprising a recovered array $\bar{I}_q$ of size $N_h \times N_w \times C$, where a first recovered image comprises the reconstructed image and q is an iteration number; and
   generating a $(q+1)^{th}$ recovered image by:
      generating a non-filtered sampled image according to an operation defined by:

$$S=(I-\bar{I}_q) \odot M$$

where:
         I is an image array of size $N_h \times N_w \times C$ associated with the image,
         $\odot$ is an element-wise product operator, and
         S is a sampled array of size $N_h \times N_w \times C$ associated with the non-filtered sampled image;
      generating a filtered sampled image by applying a low pass filter on the non-filtered sampled image;
      generating a scaled sampled image by multiplying the filtered sampled image by a scalar smaller than 2; and
      obtaining the $(q+1)^{th}$ recovered image by adding the $q^{th}$ recovered image to the scaled sampled image.

8. The method of claim 7, wherein generating the binary mask M comprises:
   setting an $(i, j, c)^{th}$ entry of the binary mask M to 1 responsive to a first condition according to $|I-\bar{I}_q|_{i,j,c} \leq \epsilon$ being satisfied, where:
      $|I-\bar{I}_q|_{i,j,c}$ is an $(i, j, c)^{th}$ entry of $|I-\bar{I}_q|$, and
      $\epsilon$ is a noise threshold; and
   setting the $(i, j, c)^{th}$ entry of the binary mask M to 0 responsive to a second condition according to $|I-\bar{I}_q|_{i,j,c} > \epsilon$ being satisfied.

9. The method of claim 7, wherein repeating the second iterative process comprises repeating the second iterative process until one of an iteration condition and a distance condition is satisfied,
   wherein:
      the iteration condition comprises $q \geq Q$, where Q is a maximum number of iterations; and
      the distance condition comprises $\|\bar{I}_q - \bar{I}_{q+1}\|_F \leq \delta$, where $\|.\|_F$ is a Frobenius norm and $\delta$ is a termination threshold.

10. The method of claim 7, wherein applying the low pass filter comprises applying an exponential filter on the non-filtered sampled image.

11. A system for denoising an image, the system comprising:
   a memory having processor-readable instructions stored therein; and
   one or more processors configured to access the memory and execute the processor-readable instructions, which, when executed by the one or more processors configures the one or more processors to perform a method, the method comprising:
      training a fully convolutional neural network (FCN) by:
         generating an $n^{th}$ training image of a plurality of training images, the $n^{th}$ training image comprising a plurality of training channels and a training array $I_n$ of size $N_h \times N_w \times C$, where:
            $N_h$ is a height of the $n^{th}$ training image,
            $N_w$ is a width of the $n^{th}$ training image,
            C is a number of the plurality of training channels,
            $1 \leq n \leq N$, and
            N is a number of the plurality of training images;
         initializing the FCN with a plurality of initial weights; and
         repeating a first iterative process until a first termination condition is satisfied, comprising:
            extracting an $n^{th}$ denoised training image from an output of the FCN by applying the FCN on the $n^{th}$ training image, the $n^{th}$ denoised training image comprising a denoised array $\hat{I}_n$ of size $N_h \times N_w \times C$;
            generating a plurality of updated weights by minimizing a loss function comprising $\Sigma_{n=1}^{N} \|I_n - \hat{I}_n\|$ where $|.|$ is an L1 norm, each updated weight of the plurality of updated weights associated with a respective initial weight of the plurality of initial weights; and
            replacing the plurality of initial weights with the plurality of updated weights;
      generating a reconstructed image by applying the FCN on the image.

12. The system of claim 11, wherein generating the $n^{th}$ training image comprises:
   extracting a random variable p from a noise probability distribution, a lower bound of a support set of the noise probability distribution equal to $p_l$ and an upper bound of the support set equal to $p_u$ where $0 \leq p_l \leq p_u \leq 1$, $$\frac{p_l + p_u}{2} \leq \mu,$$

and $\mu$ is a mean of the noise probability distribution; and
   obtaining the training array $I_n$ by:
      extracting a binary random variable from a Bernoulli probability distribution, a parameter of the Bernoulli probability distribution equal to p;
      setting an $(i, j, c)^{th}$ entry of the training array $I_n$ to an $(i, j, c)^{th}$ entry of an $n^{th}$ original image responsive to the binary random variable being equal to 0 where $1 \leq i \leq N_h$, $1 \leq j \leq N_w$, and $1 \leq c \leq C$;
      extracting a noise value from a uniform probability distribution, a support set of the uniform probability distribution equal to an intensity range of the $n^{th}$ original image; and
      setting the $(i, j, c)^{th}$ entry of the training array $I_n$ to the noise value responsive to the binary random variable being equal to 1.

13. The system of claim 12, wherein extracting the random variable p from the noise probability distribution comprises extracting the random variable p from a truncated Gaussian probability distribution.

14. The system of claim 11, wherein applying the FCN on the $n^{th}$ training image comprises:
   extracting an $(L+1)^{th}$ plurality of training feature maps from an output of an $L^{th}$ convolutional layer of a plurality of convolutional layers associated with the FCN where L is a number of the plurality of convolutional layers, extracting the $(L+1)^{th}$ plurality of training feature maps comprising obtaining an $(l+1)^{th}$ plurality of training feature maps where $1 \leq l \leq L$, by:
      generating an $(l+1)^{th}$ plurality of filtered training feature maps by applying an $l^{th}$ plurality of filters on an $l^{th}$ plurality of training feature maps, a first plurality of training feature maps comprising the plurality of training channels, a number of the $l^{th}$ plurality of filters equal to $M_l$, where:

$$r = \left\lceil \frac{l}{R} \right\rceil \text{ where } \lceil \cdot \rceil$$

is a ceiling operator,
R is a positive integer,
$M_t < M_{t+1}$ where $$t \leq \left\lceil \frac{l}{2R} \right\rceil - 1,$$

and
$M_{s+1} < M_s$ where $$s \geq \left\lceil \frac{l}{2R} \right\rceil;$$

generating an $(l+1)^{th}$ plurality of normalized training feature maps by applying a batch normalization process on the $(l+1)^{th}$ plurality of filtered training feature maps, each normalized training feature map of the $(l+1)^{th}$ plurality of normalized training feature maps associated with a respective filtered training feature map of the $(l+1)^{th}$ plurality of filtered training feature maps; and generating the $(l+1)^{th}$ plurality of training feature maps by implementing an $l^{th}$ non-linear activation function on each of the $(l+1)^{th}$ plurality of normalized training feature maps; and applying a sigmoid function on each of the $(L+1)^{th}$ plurality of training feature maps.

15. The system of claim 14, wherein applying the FCN on the image comprises:
feeding the image to a first convolutional layer of the plurality of convolutional layers;
extracting an $(L+1)^{th}$ plurality of feature maps from the output of the $L^{th}$ convolutional layer by obtaining an $(l+1)^{th}$ plurality of feature maps, comprising:
generating an $(l+1)^{th}$ plurality of filtered feature maps by applying the $l^{th}$ plurality of filters on an $l^{th}$ plurality of feature maps, a first plurality of feature maps comprising a plurality of channels associated with the image;
generating an $(l+1)^{th}$ plurality of normalized feature maps by applying the batch normalization process on the $(l+1)^{th}$ plurality of filtered feature maps, each normalized feature map of the $(l+1)^{th}$ plurality of normalized feature maps associated with a respective filtered feature map of the $(l+1)^{th}$ plurality of filtered feature maps; and
generating the $(l+1)^{th}$ plurality of feature maps by implementing the $l^{th}$ non-linear activation function on each of the $(l+1)^{th}$ plurality of normalized feature maps; and
applying the sigmoid function on each of the $(L+1)^{th}$ plurality of feature maps.

16. The system of claim 11, wherein minimizing the loss function comprises minimizing a total loss function defined by:

$$L_{total} = \lambda_1 L_1 + \lambda_2 L_2 + \lambda_3 L_3 + \lambda_4 L_4,$$

where:
$L_1 = \sum_{n=1}^{N} (\hat{I}_n - \tilde{I}_n)^2,$ $\tilde{I}_n$ is an original array of size $N_h \times N_w \times C$ associated with the $n^{th}$ original image, $$L_2 = \sum_{n=1}^{N} |\hat{I}_n - \tilde{I}_n|,$$

$$L_3 = \sum_{n=1}^{N} |I_n - \hat{I}_n|,$$

$$L_4 = \sum_{n=1}^{N} \frac{1 - SSIM(\hat{I}_n, \tilde{I}_n)}{2},$$

$SSIM(\hat{I}_n, \tilde{I}_n)$ is a structural similarity index measure of the $n^{th}$ denoised training image and the $n^{th}$ original image, and
each of $\lambda_1$, $\lambda_2$, $\lambda_3$, and $\lambda_4$ is a respective non-negative coefficient.

17. The system of claim 11, wherein the method further comprises generating a denoised image comprising a denoised array $\bar{I}_{\tilde{q}}$ by repeating a second iterative process until a second termination condition is satisfied, where $\tilde{q}$ is a total number of iterations of the second iterative process when the second termination condition is satisfied, repeating the second iterative process comprising:
generating a binary mask M from a $q^{th}$ recovered image comprising a recovered array $\bar{I}_q$ of size $N_h \times N_w \times C$, where a first recovered image comprises the reconstructed image and q is an iteration number; and
generating a $(q+1)^{th}$ recovered image by:
generating a non-filtered sampled image according to an operation defined by:

$N = (I - \bar{I}_q) \odot M$ where:
I is an image array of size $N_h \times N_w \times C$ associated with the image,
$\odot$ is an element-wise product operator, and
S is a sampled array of size $N_h \times N_w \times C$ associated with the non-filtered sampled image;
generating a filtered sampled image by applying a low pass filter on the non-filtered sampled image;
generating a scaled sampled image by multiplying the filtered sampled image by a scalar smaller than 2; and
obtaining the $(q+1)^{th}$ recovered image by adding the $q^{th}$ recovered image to the scaled sampled image.

18. The system of claim 17, wherein generating the binary mask M comprises:
setting an $(i, j, c)^{th}$ entry of the binary mask M to 1 responsive to a first condition according to $|I-\bar{I}_q|_{i,j,c} \leq \epsilon$ being satisfied, where:
$|I-\bar{I}|_{i,j,c}$ is an $(i, j, c)^{th}$ entry of $|I-\bar{I}_q|$, and
$\epsilon$ is a noise threshold; and
setting the $(i, j, c)^{th}$ entry of the binary mask M to 0 responsive to a second condition according to $|I-\bar{I}_q|_{i,j,c} > \epsilon$ being satisfied.

19. The system of claim 17, wherein repeating the second iterative process comprises repeating the second iterative process until one of an iteration condition and a distance condition is satisfied,
wherein:
the iteration condition comprises $q \geq Q$, where Q is a maximum number of iterations; and
the distance condition comprises $\|\bar{I}_q - \bar{I}_{q+1}\|_F \leq \delta$, where $\|.\|_F$ is a Frobenius norm and $\delta$ is a termination threshold.

20. The system of claim 17, wherein applying the low pass filter comprises applying an exponential filter on the non-filtered sampled image.

\* \* \* \* \*